March 16, 1937.  H. C. POND  2,073,905
TRACTOR GUIDE
Filed May 28, 1936  2 Sheets-Sheet 1
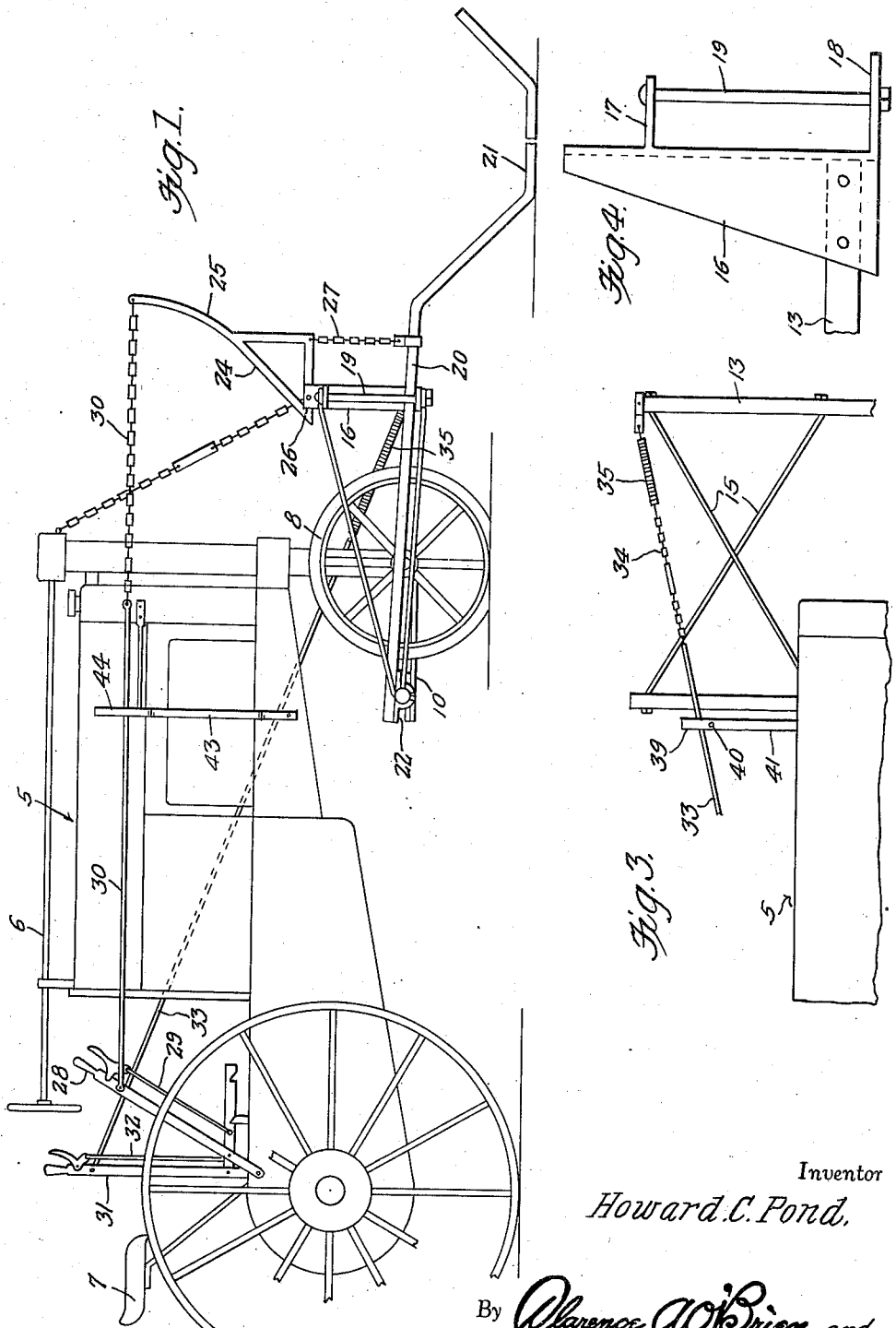
Inventor
Howard C. Pond,
By Clarence A. O'Brien and
Hyman Berman
Attorneys

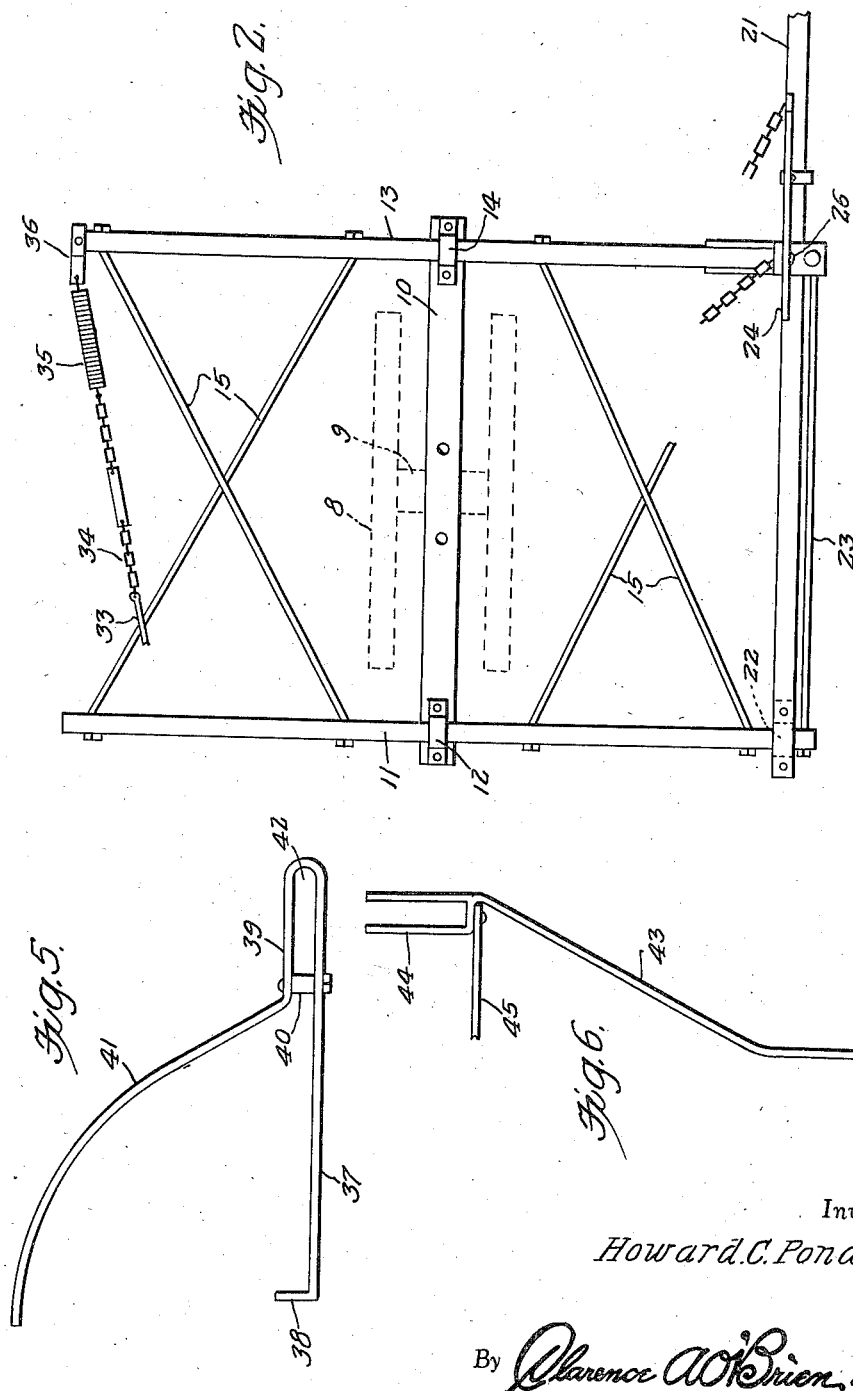

Patented Mar. 16, 1937

2,073,905

UNITED STATES PATENT OFFICE 2,073,905

TRACTOR GUIDE

Howard C. Pond, Roland, Iowa

Application May 28, 1936, Serial No. 82,363

1 Claim. (Cl. 97—49)

This invention appertains to new and useful improvements in guides for tractors. The principal object of the present invention is to provide a tractor guide in the form of an adjustable runner adapted to ride in the last plowed furrow for guiding the tractor in determining the spacing in relation thereto of subsequent furrows.

Another important object of the invention is to provide guide means for tractors which can be readily manipulated and which in use will be accurate in gauging the travel of the tractor.

These and various other important objects and advantages of the invention will become apparent to the reader of the following specification.

In the drawings:

Figure 1 represents a side elevational view of the guide mounted on a tractor;

Figure 2 is a fragmentary top plan view of the carriage for the guide;

Figure 3 is a fragmentary top plan view of the carriage and tractor disclosing the connection for the tilting control;

Figure 4 is a fragmentary elevational view of the guide means for the runner arm;

Figure 5 is a side elevational view of the tilting control guide;

Figure 6 is a fragmentary side elevational view of the guide for the runner adjusting means.

Referring to the drawings wherein like numerals designate like parts, it can be seen that numeral 5 generally refers to a tractor on which is the usual steering mechanism 6, driver's seat 7, and front steerable wheels 8—8. These front steerable wheels 8—8 have an axle inside of the axle housing 9 to which the longitudinally extending bar 10 is clamped, this bar extending between the wheels as shown in Figure 2. An elongated stationary shaft 11 is clamped at its intermediate portion to the rear end of the bar 10 as at 12, while an elongated beam 13 is clamped at its intermediate portion to the forward end of the bar 10 as at 14. The shaft 11 and beam 13 are braced with respect to each other by crossed brace rods 15

Mounted upon one end of the beam 13 is the upstanding angle member 16 from which the outwardly extending arms 17—18 are struck and bent outwardly in horizontal parallel relation. These arms 17—18 are apertured to receive the vertical pin or bolt 19 between which and the angle member 16 space is afforded and through which the arm 20 of the runner 21 extends, the rear end of this arm 20 having a bearing structure 22 disposed around the adjacent end of the shaft 11. The tie rod 23 is provided between the runner end of the shaft 11 and beam 13. A triangular-shaped frame 24 has an upstanding curved arm 25 and this frame 24 is pivotally secured to the upper portion of the angle member 16 as at 26. The forward portion of this frame 24 is connected to the forward portion of the arm 25 by the chain 27. A hand lever 28 adjacent the driver's seat is provided with a detent 29 and a rod 30 extending therefrom to connect to the chain 30 which in turn connects to the upper portion of the arm 25. Obviously, by pulling this hand lever 28 backwardly, the frame 24 is rocked with the result that the runner 21 can be lifted in the furrow or entirely out of the furrow. The entire frame structure or carriage 11—13—15 for the runner 21 can be adjusted through the use of the second hand lever 31 which is provided with the detent 32. From this hand lever 31 the rod 33 extends and connects to the chain 34 which in turn connects to one end of the coiled extensible spring 35, which in turn connects to one end of the beam 13 as at 36.

To guide the rod 33, a metallic strap 37 is secured at its upturned end 38 to the side of the tractor and extends outwardly and backwardly as at 39 and then upwardly as at 40 to again connect to the tractor body. The parallel portions 39 have a spacing means 40 defining a slotway 42 in which the rod 33 can work.

For the rod 30 of the runner control means, a guide is provided as shown in Figure 6. This last-mentioned guide consists of the arm 43 which is secured at its lower edge to the frame of the tractor end while its upper end is provided with a U-shaped structure 44 and a brace member 45. The rod 30 operates in the U-shaped structure 44.

While the foregoing specification sets forth the invention in specific terms, it is to be understood that numerous changes in the shape, size, and materials may be resorted to without departing from the spirit and scope of the invention claimed hereinafter.

Having described the invention, what is claimed as new is:

In combination with a tractor, a pair of steerable wheels, a bar carried by the steerable wheels, a frame supported by the bar, an arm swingably supported at the rear portion of the frame and projecting forwardly over the frame and provided with a runner for engagement into a furrow, means for regulating the position of the said frame, and means whereby the runner can be elevated and lowered with respect to the ground.

HOWARD C. POND.